United States Patent Office 3,504,785
Patented Apr. 7, 1970

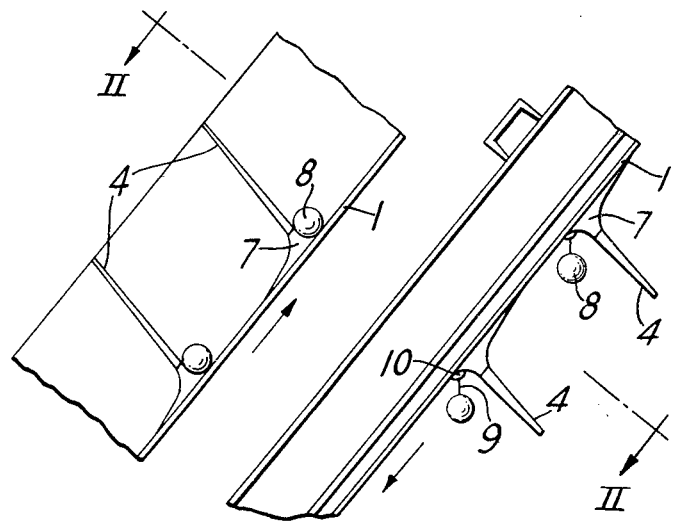
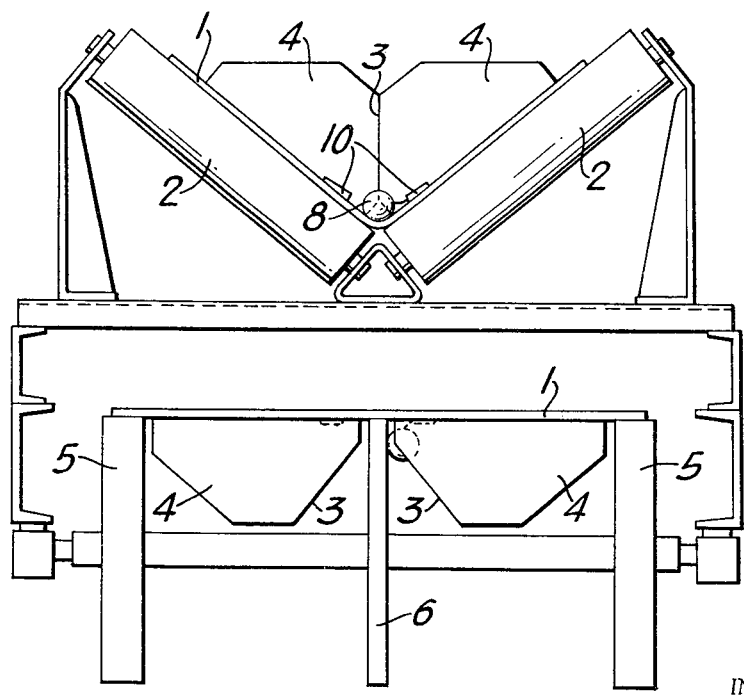
FIG. 1
FIG. 2
INVENTOR.
WERNER GÄRTNER

3,504,785
V-TROUGH-SHAPED CONVEYOR BELT, PARTICULARLY FOR STEEP CONVEYING
Werner Gartner, Heiligenhaus-Hetterscheid, Germany, assignor, by mesne assignments, to Koppers Company, Inc., Pittsburgh, Pa., a corporation of Delaware
Filed Feb. 7, 1968, Ser. No. 703,664
Int. Cl. B65g *15/44*
U.S. Cl. 198—198                      2 Claims

ABSTRACT OF THE DISCLOSURE

The invention relates to a V-trough-shaped conveyor belt, particularly for steep conveying, with baffle plates, which are arranged opposite one another on both inclined parts of the belt and form a wall that intersects the major portion of the cross section of the conveyor. These baffle plates are essentially triangularly constructed and their vertically joined edges are recessed somewhat in the vicinity of the bending place of the conveyor belt. By such a design of the baffle plates it is possible to support the returning belt by a centrally arranged guide or by supporting wheels.

BACKGROUND OF THE INVENTION

It has now been indicated that the preceding known apparatus for the conveying of fine-grained material or a material that contains fine grains, has a disadvantage. The latter consists in the fact that the fine-grained material can flow to a considerable extent through the opening that is formed by the recessed edges of the baffle plates in the vicinity of the bending place of the belt. Thus, it could be observed that a part of the material fell down from the belt at the feeding place of a belt serving for steep conveying.

The object of the invention is to improve the known conveyor belt so that the fed and conveyed material remains with certainty in the intermediate space between two walls formed from baffle plates. For this purpose the proposal of the present invention is to provide a movably arranged closing element, particularly a rubber ball, in front (in the conveying direction of the belt) of the opening, which is formed by the recessed edges of the baffle plates.

According to another characteristic of the invention the closing element is fastened on a band, which in turn is preferably detachably connected with a rubber pad that is vulcanized on in the vicinity of the foot of the baffle plate.

As is directly understandable, the invention can have many forms. However, it is decisive that care is taken that in the upper track of the conveyor belt the closing piece is positively in front of the opening in the wall formed by the two baffle plates, while in the lower track it releases, by its own weight, the center of the conveyor belt, which is supported by a guide or by supporting rollers.

SUMMARY OF THE INVENTION

A conveyor belt is provided with a plurality of pairs of baffle plates. Each pair of baffle plates is arranged transversely of the belt, and the pairs of baffle plates cooperate to form material conveying pockets along the belt. A ball-type sealing member affixed to a flexible member closes the opening where the baffles overlap near the belt surface.

BRIEF DESCRIPTION OF THE DRAWING

The invention is illustrated by way of example in the drawing in which:
FIG. 1 illustrates a partial longitudinal section through a conveyor belt, and
FIG. 2 illustrates a cross section along line II—II of FIG. 1.

DETAILED DESCRIPTION

The conveyor belt 1 is supported in the upper track by inclinedly mounted rollers 2, whereby the belt forms a V-shaped trough. In this position the edges 3 of the baffle plates 4 touch one another or overlap slightly and thus close the major part of the cross section of the conveyor. The baffle plates themselves are essentially triangularly constructed and in the present case are opposite one another and are vulcanized on the two inclined parts of the belt perpendicularly to the longitudinal direction of the belt. As is apparent from FIG. 1, such pairs of baffle plates are arranged in succession at a definite distance in the longitudinal direction of the belt so that pockets are formed for the to-be-conveyed material.

In the lower track the conveyor belt 1 is supported by side wheels 5 as well as by centrally arranged wheels 6. As a result of the latter a free space must remain between the baffle plates that hang down in the lower track. In turn, this has the result that in the upper track an opening 7 is present in the vicinity of the bending place of the belt. Now, according to the basic concept of the invention, a rubber ball 8 is arranged in front (in the conveying direction of the belt) of the opening 7 in order to close this opening to prevent an undersired passage of material. This ball is fastened on a band 9, which is connected with a rubber pad 10 that is vulcanized on the foot of the baffle plate beyond the center of the belt. The connection of the band with the rubber pad is provided in a suitably detachable manner and each baffle plate is also provided with a pad.

It is apparent from the drawing that the rubber ball 8 is in front of the opening 7 in the upper track and that it tightly closes this opening as intended, while in the lower track it hangs down by its own weight and thus releases the necessary place for the supporting rollers 6.

What is claimed is:
1. In a V-shaped trough conveyor belt having baffle plates, arranged opposite one another on both parts of the V-shaped-trough belt, that form a wall across the major portion of the cross section of the V-shaped-trough belt and that are essentially triangular in shape and recessed along their vertically adjacent edges in the vicinity of the bending place of the conveyor belt, the improvement comprising:
 (a) a movably arranged rubber ball that lodges in front of the opening formed by the recessed edges of said baffle plates; and
 (b) means securing said ball to said belt.
2. A V-shaped-trough conveyor belt as defined in claim 1 wherein:
 (a) said means securing said ball includes a band secured to said ball; and
 (b) a pad secured to said belt, with
 (c) means detachably securing said band to said pad.

FOREIGN PATENTS 1,845,780   1/1962   Germany.

GERALD M. FORLENZA, Primary Examiner
F. E. WERNER, Assistant Examiner